United States Patent [19]
Ostman

[11] Patent Number: 5,408,504
[45] Date of Patent: Apr. 18, 1995

[54] SYMBOL AND FRAME SYNCHRONIZATION IN A TDMA SYSTEM

[75] Inventor: Kjell I. Ostman, San Diego, Calif.

[73] Assignee: Nokia Mobile Phones, Salo, Finland

[21] Appl. No.: 998,903

[22] Filed: Dec. 30, 1992

[51] Int. Cl.6 ............................................. H04L 7/00
[52] U.S. Cl. ..................................... 375/354; 375/343;
370/105.1; 364/728.03
[58] Field of Search ..................... 375/14, 12, 94–96,
375/103, 106, 114, 116, 101; 370/105.1, 106;
379/58; 364/724.16, 724.19, 728.03

[56] References Cited

U.S. PATENT DOCUMENTS

| | | | |
|---|---|---|---|
| 4,692,931 | 9/1987 | Ohsawa | 375/106 |
| 4,805,191 | 2/1989 | Burch et al. | 375/106 |
| 4,847,880 | 7/1989 | Kamerman et al. | 375/106 |
| 4,975,927 | 12/1990 | Yoshida | 375/106 |

Primary Examiner—Stephen Chin
Assistant Examiner—Young Tse
Attorney, Agent, or Firm—Perman & Green

[57] ABSTRACT

A digital radio communication system includes a receiver for receiving a signal stream that includes data frames, each frame including a data signal sequence and a synchronizing sequence. The communication system synchronizes the receiver by employing the signal stream and comprises: a sampling circuit for sampling symbol levels in the synchronizing signal sequence; cross correlation circuitry for comparing values derived from the sampled symbol levels with an expected set of values and producing an error value output; and correction circuitry that is responsive to the error output and produces a sample control output to the sample circuitry to alter the times of sampling of the symbol levels so as to reduce the error output and achieve time synchronization with the received synchronizing signal sequence.

9 Claims, 7 Drawing Sheets

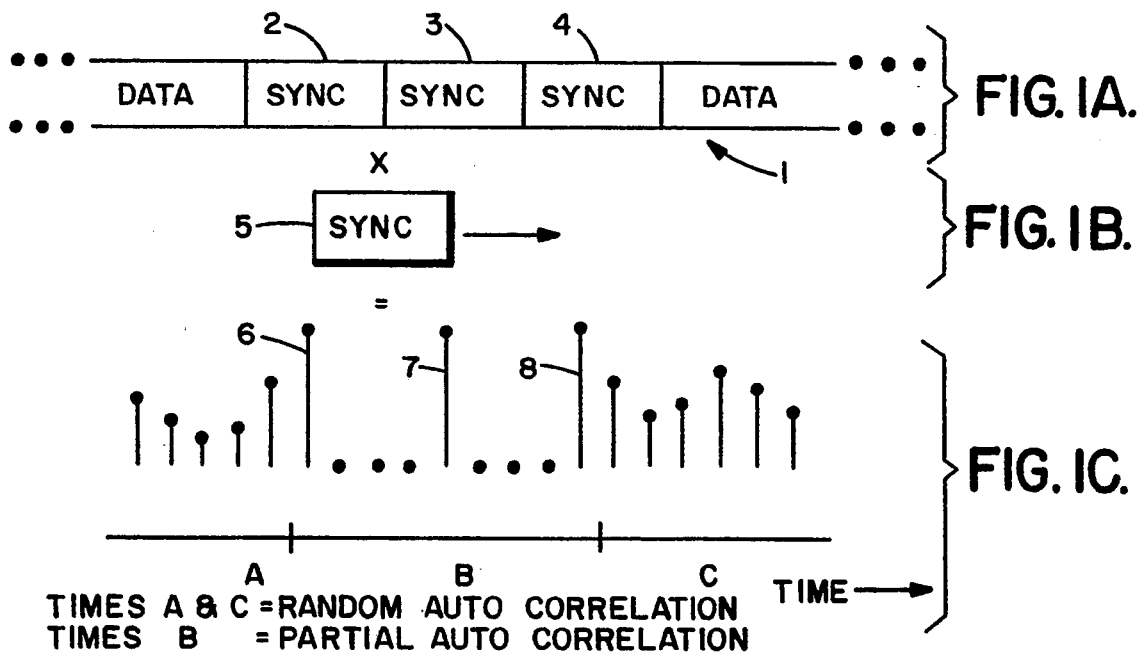
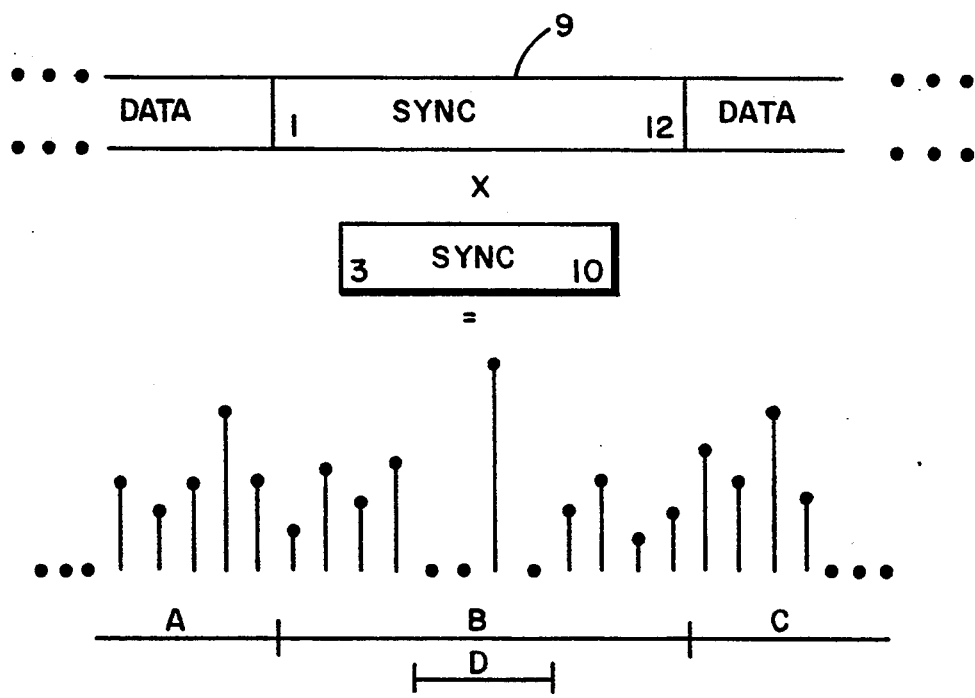
FIG. 2

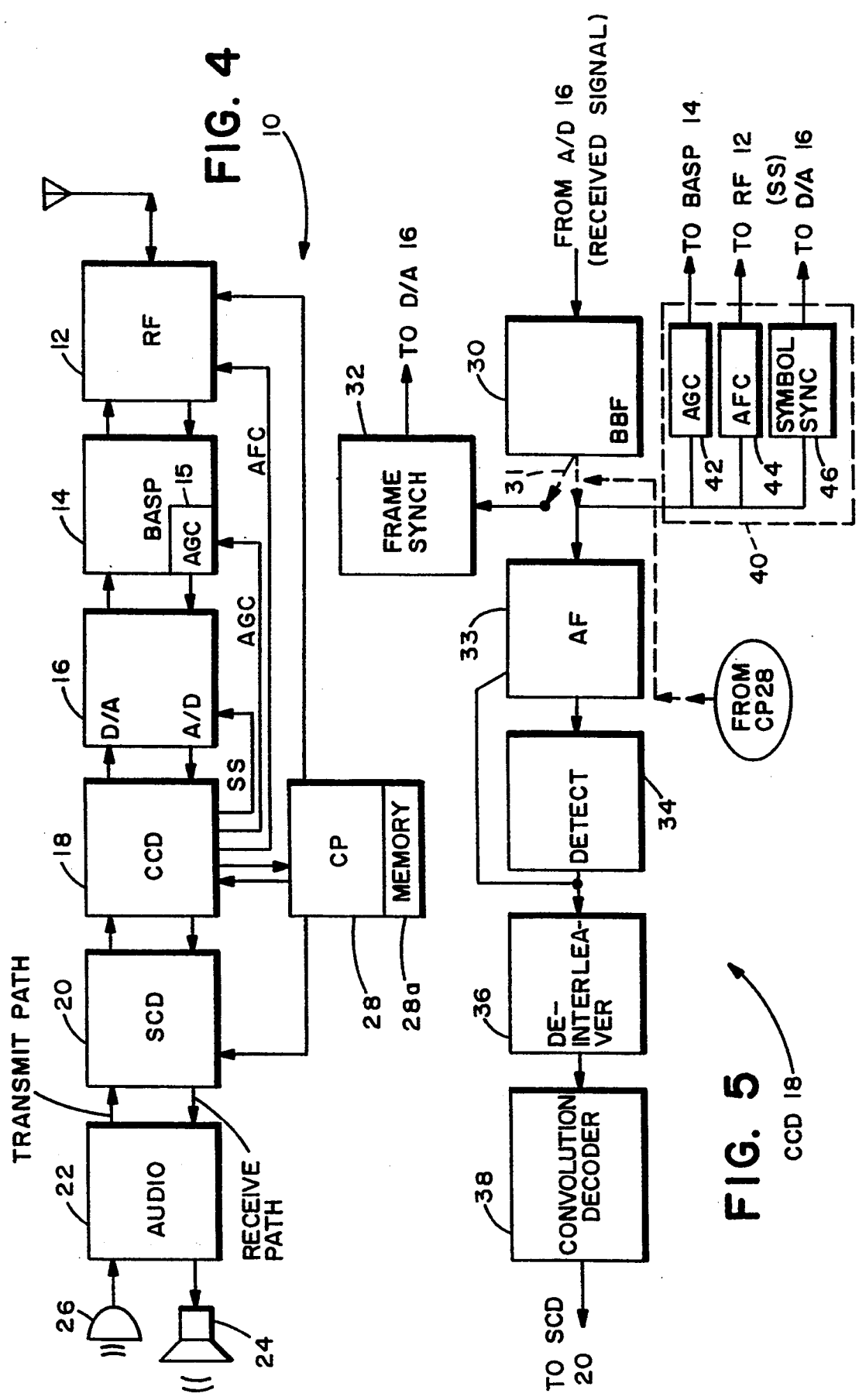

SYMBOL AND FRAME SYNCHRONIZATION IN A TDMA SYSTEM

FIELD OF THE INVENTION

This invention relates to digital data transmission and reception systems, and more particularly, to apparatus for achieving symbol and frame synchronization in a multi-path propagation environment.

BACKGROUND OF THE INVENTION

Many digital radio transmission systems transmit data frames that comprise interspersed data and synchronization sequences. Cellular telephone systems employ such TDMA protocols and are an example of a system in which the invention hereof may be employed. Each receiving station has an assigned synchronization sequence that enables the station to selectively decode accompanying data. Such synchronization sequences are utilized in time division multiple access (TDMA) systems wherein separate users are allocated separate time slots of a same frequency bandwidth. Each time slot is accompanied by a synchronization sequence that is known to a receiving station and enables that receiving station to achieve synchronization with the transmitted signal.

Often a synchronization sequence is chosen so that it exhibits a zero autocorrelation characteristic. More specifically, if such a synchronization sequence is correlated with itself, only when the sequences being correlated are aligned, does the correlator generate a pulse output. At other times, the correlator's output is zero or nearly zero. A synchronization sequence exhibiting a zero autocorrelation characteristic allows an impulse response of a channel to be estimated and enables synchronization actions to occur.

In FIG. 1, a TDMA signal train 1 indicates three identical synchronization sequences 2, 3 and 4 interspersed between a pair of data time slots. A receiver stores a copy 5 of the synchronizing sequence and causes it to be sequentially compared to the received sequences 2, 3 and 4 during autocorrelation. Only when copy 5 is perfectly aligned with a synchronizing sequence 2, 3 and 4 does an autocorrelator produce a pulse output (e.g. pulses 6, 7 and 8, respectively). Since pulse output 7 is isolated by adjacent zero outputs (due to the zero autocorrelation characteristics of the synchronizing sequence), pulse 7 can be easily isolated and used to commence a frame synchronization operation.

In FIG. 2, only a single synchronizing sequence 9 is transmitted. A partial autocorrelation can be accomplished by using only a subset of the synchronizing sequence (e.g. bits 3-10 when a synchronizing sequence 9 comprises bits 1-12). During times A and C, the subset shows a random correlation with incoming data. During time B a partial autocorrelation function is exhibited, and during time D, a zero autocorrelation property is exhibited.

In FIGS. 1 and 2, a symbol sample rate of once per symbol is assumed. Under such circumstances, frame synchronization, plus or minus one symbol time, can be achieved. In FIG. 3, an autocorrelation function is shown that is achieved when the sample rate is performed at twice the symbol rate. Such a partial autocorrelation takes the approximate form of the impulse response of the channel.

Cellular telephone systems often suffer from multi-path propagation effects, where a receiver sees copies of a transmitted signal that have traveled different paths between the transmitter and the receiver. Generally such paths are of different lengths and cause the copies of the transmitted signals to be delayed relative to each other. If the signalling rates in such systems are sufficiently high, multipath propagation causes intersymbol interference which, in turn, makes signal detection impossible.

The term symbol is used in this context to refer to transmitted signals that are phase modulated with discrete phase relationships, each assigned phase relationship being a symbol that is subject to detection at a receiver. The term intersymbol interference refers to two or more symbols that are superimposed upon each other, phase detection of each symbol thus becoming extremely difficult, if not impossible.

Systems for modulating the phase of a carrier wave to represent digital binary data are known in the prior art. A four state modulator (quaternary phase shift keying or QPSK) enables a carrier wave to take four different phase values depending on values assumed by successive two-bit binary groups. Each of the four equi-spaced phases is separated by 90°.

Generally, if no pilot synchronization signal is generated by the transmitter, the receiver must derive symbol timing from the received signal. Both the transmitter and receiver employ separate station clocks which drift, relative to each other, and any symbol synchronization technique must be able to track such drift. Furthermore, in the case of intersymbol interference as a result of multi-path propagation, many receivers employ equalization techniques to enable differentiation of multi-path received signals. If the received signal is to be detected without aid of an equalization procedure, the time of sampling of the received signal must be optimally chosen. If equalization is used, the method chosen must be able to operate over a time span at least as long as the delay between the signal paths. However, the longer the time span of the equalizing method, the more computation power is required. To minimize the required computation power, the equalizing method needs to be optimally aligned to the incoming signal. The problem is further complicated by the fact that where one of the communicating stations is mobile, the multi-path propagation phenomena is accompanied by signal jitter during the reception window.

Consequently, it is an object of this invention to provide a method and apparatus to track clock drift in a receiver.

It is a further object of this invention to lock a sampling instant to an optimum symbol phase for detection.

It is a still further object of this invention to align an equalizer with a received signal in such a way that the time span and corresponding computational power requirements of an equalizer are minimized.

It is another object of this invention to provide a system for synchronizing both frames and symbols received in a multi-path propagation environment.

It is still another object of this invention to provide a frame synchronization system that enables a first received frame to be chosen as the one upon which to synchronize.

It is yet another object of this invention to provide a symbol and frame synchronization method for a TDMA data communications system wherein only two sample instances per symbol are employed.

SUMMARY OF THE INVENTION

A digital radio communication system includes a receiver for receiving a signal stream that includes data frames, each frame including a data signal sequence and a synchronizing signal sequence. The communication system synchronizes the receiver by employing the signal stream and comprises: a sampling circuit for sampling symbol levels in the synchronizing signal sequence; cross correlation circuitry for comparing values derived from the sampled symbol levels with an expected set of values and producing an error value output; and correction circuitry that is responsive to the error output and produces a sample control output to the sample circuitry to alter the times of sampling of the symbol levels so as to reduce the error output and achieve time synchronization with the received synchronizing signal sequence.

DESCRIPTION OF THE DRAWINGS

FIG. 1a–1c illustrates the use of a periodic synchronization sequence FIG. 1a, the generation of its autocorrelation function FIG. 1b and the resulting autocorrelation function FIG. 1c.

FIG. 2 illustrates the use of a synchronization sequence having partial zero autocorrelation and the resulting autocorrelation function.

FIG. 4 is a block diagram of a digital radio telephone.

FIG. 5 is a block diagram of a decoder portion of a channel coder/decoder shown in FIG. 1.

DETAILED DESCRIPTION OF THE INVENTION

Figure 3:
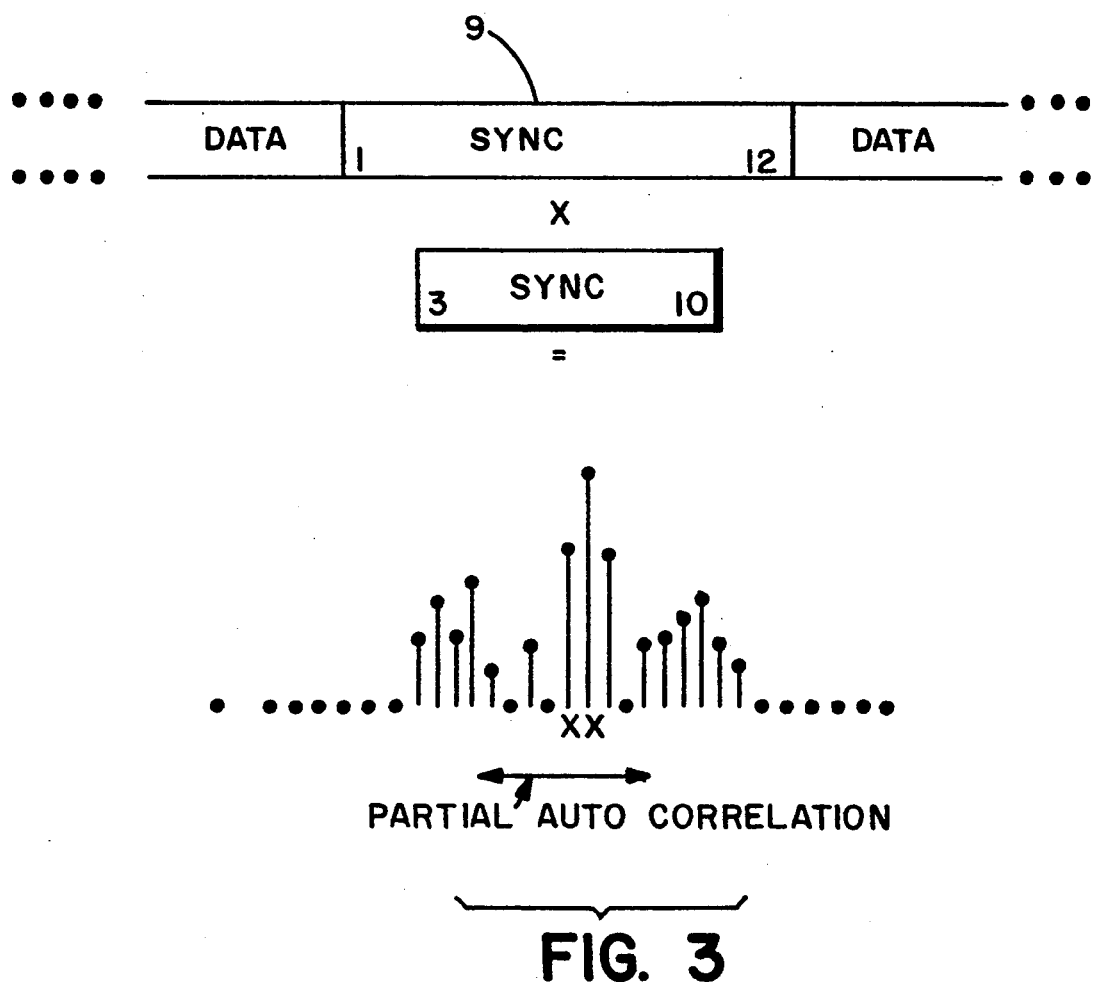
FIG. 3 illustrates the resulting autocorrelation function when the autocorrelation function is calculated two instances per signaling symbol.

A digital radio telephone is described that employs a frame synchronizer to provide a signal lock onto an incoming frame. Subsequently, the telephone achieves symbol synchronization through the use of pairs of sampled amplitude values from detected, incoming symbol waveforms. In FIG. 4, a simplified block diagram is shown of a digital radio telephone 10. In the ensuing description, reference will be made only to the reception path of the signal, although it will be realized by those skilled in the art that approximately the same signal processing occurs in the transmission path, but in a reverse order.

An antenna provides input to a radio frequency (RF) block 12 which down/converts a received RF signal from an assigned frequency, in one or more steps, to a frequency low enough (preferably baseband) to be digitally processed. RF block 12 also accomplishes necessary channel filtering.

A baseband analog signal processing block (BASP) 14 includes an automatic gain control circuit (AGC) 15 and performs baseband filtering. The output of BASP 14 is applied to an analog to digital converter (A/D) 16. A channel coder/decoder (CCD) 18 receives the digital representation of the filter's output signal and determines channel correction coefficients for an adaptive equalizer.

A speech coder/decoder (SCD) 20 converts the bits received from CCD 18 into a pulse code modulated (PCM) signal which is then expanded and converted to an analog signal by an audio block (AUDIO) 22. The output of AUDIO block 22 is the speech signal that is output by a loud speaker 24. A microphone 26 is also coupled to AUDIO block 22 and provides an analog representation of user speech. The user speech is then passed through the transmit path, in a manner opposite to that described above, to be eventually transmitted from the antenna.

A control processor (CP) 28 is employed to assign RF 12 and CCD 18 to a selected channel and to manage required protocols between mobile station 10 and a base station (not shown). It further manages a required user interface. CP 28 includes or is coupled to a memory 28a that stores instructions and data.

FIG. 5 is a block diagram that illustrates, in greater detail, components of CCD 18 in FIG. 4. An input signal from A/D 16 is low pass filtered by baseband filter (BBF) 30 and is then applied through a switch 31 (schematically shown) to either frame synchronizer block 32 or adaptive filter block (AF) 33. The output from BBF 30 is not applied to AF 33 until frame synchronization has been achieved (a preset time interval). Thus, switch 31 is, initially, in its uppermost position so as to apply the output of BBF 30 to frame synchronizer block 32. The position of switch 31 is controlled by an output from control processor 28 (see FIG. 4) and is caused to connect BBF block 30 to adaptive filter block 33 after a preset interval, during which time frame synchronization is achieved. After frame synchronization, A/D block 16 converts only data within the frame.

AF 33 provides its output to a detector (DETECT) 34 wherein a most likely symbol from a signal constellation and the symbol's corresponding bit(s) are detected. As employed herein, a symbol is considered to be a signal amplitude and phase that is selected from a modulation signal constellation.

The detected symbol, together with an unequalized signal, is employed to update the coefficient of AF 33. Detected bits are deinterleaved (block 36) and convolutionally decoded (38) before being passed to SCD 20 in FIG. 4. The operation of blocks 36 and 38 are conventional and will not be described in further detail.

Figure 6A:
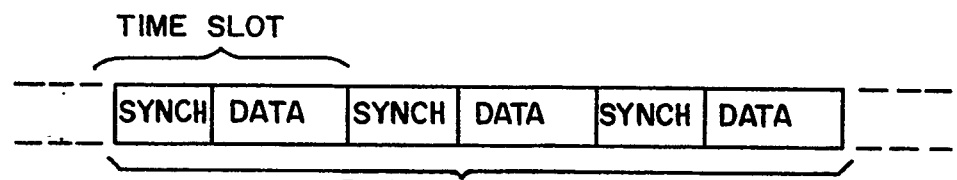
FIGS. 6a and 6b illustrate time slot arrangements and show the relationship of synchronizing sequences and data sequences.
Figure 6B:
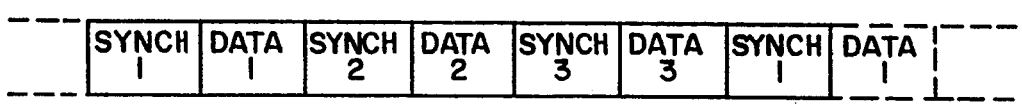

A support block 40 includes an automatic gain control (AGC) block 42, an automatic frequency control (AFC) block 44 and a symbol synchronization block 46. In FIG. 6a, frame and time slot arrangements are illustrated that occur in a digital, TDMA system. Each time slot includes a field for a synchronizing signal sequence and a field for a data sequence. Each radio telephone is assigned a specific synchronizing signal sequence and recognizes that sequence upon seeing its appearance in a time slot. A plurality of time slots (e.g., 3) comprise a frame and, as shown in FIG. 6b, time slots directed to different radio telephones may occupy adjoining positions in a frame.

Figure 7:
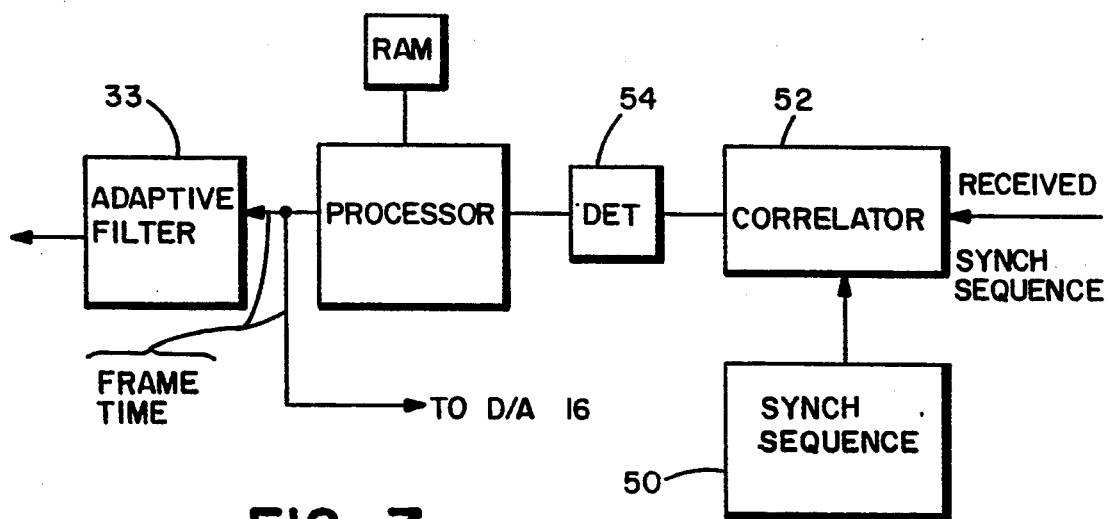
FIG. 7 is a block diagram of circuitry within frame synchronization block 32 in FIG. 5.

In order to enable decoding of data contained within the data field, both frame synchronization and symbol synchronization must be achieved. Referring to FIG. 7, the details of frame synchronizer block 32 will be described. As above indicated, each radio telephone is assigned a unique synchronizing sequence (block 50) which is applied as an input to a correlation circuit 52. Correlation circuit 52 provides a pulse output when a correlation is found between a received synchronizing sequence and the stored synchronizing sequence (block 50). That output is detected by detector 54 and applied as an input to processor 56. Processor 56 ignores all but the first detected pulse output from detector 54 so as to avoid locking onto a frame that has traveled by a less direct path and thus arrived as a delayed signal. Processor 56 determines from the output of detector 54 an approximate frame time and applies that output to adaptive filter 33 and Digital/Analog converter block 16. As a result, D/A block 16 is enabled to locate the synchronizing sequence field and enables the commencement of symbol synchronization. Once frame synchronization is achieved, switch 31 (FIG. 5) is moved to connect the output from BBF block 30 to signal synchronization block 46.

Figure 8:
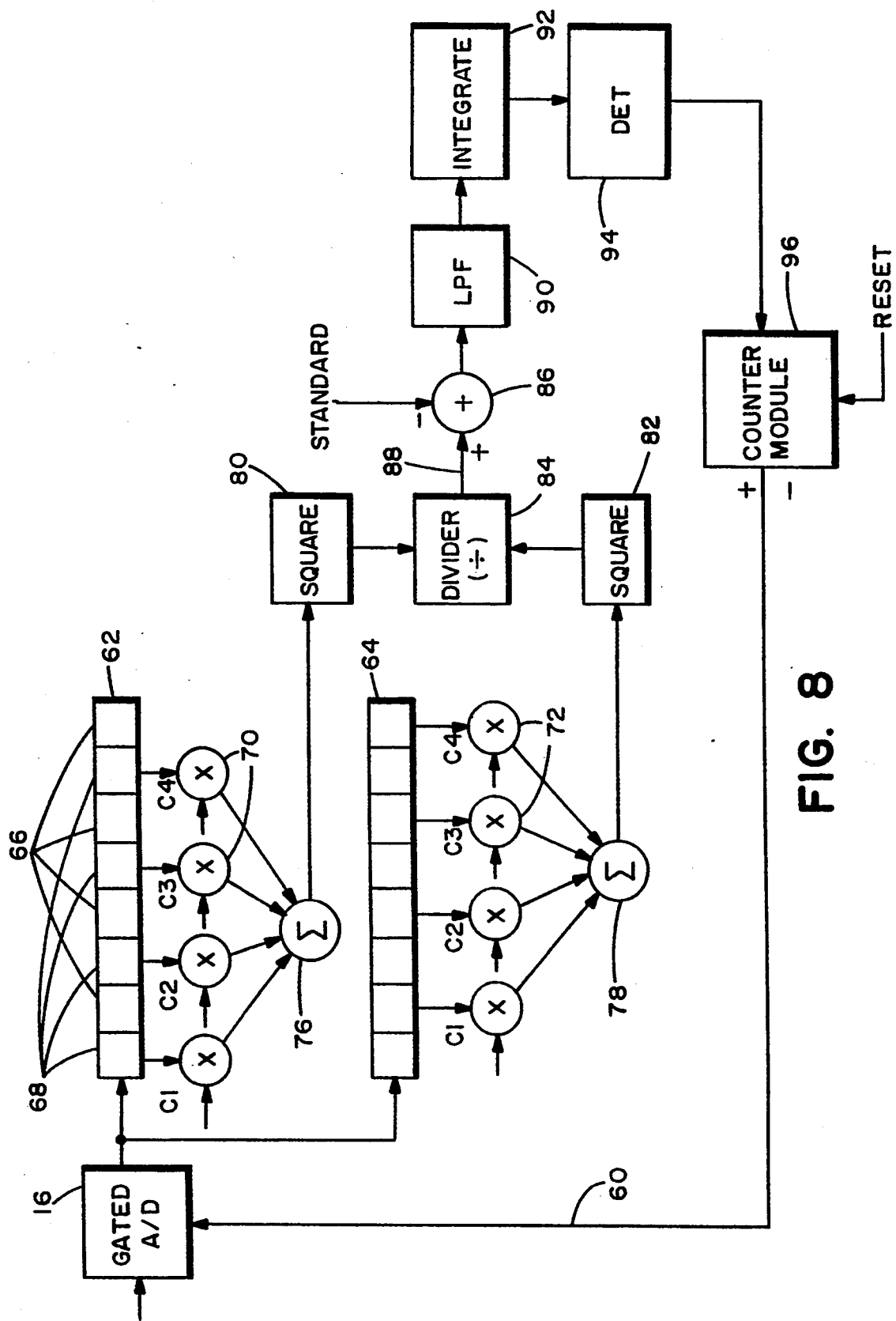
FIG. 8 is a block diagram of symbol synchronization block 46 in FIG. 5.

Referring to FIG. 8, details of symbol synchronization block 46 will be hereafter described. Symbol synchronization block 46 achieves a cross correlation between a received synchronizing signal sequence and the synchronization sequence stored within the radio telephone. The cross correlation is calculated at two time instances separated by a half signalling period. If there is no intersymbol interference present and the synchronization sequence exhibits a partial autocorrelation property, the cross correlation provides two amplitude samples of a signal pulse, the samples having a known relationship, one to the other (e.g. as illustrated in FIG. 3). The two timing instances at which the cross correlation is calculated are ideally such that one cross correlation is calculated at the peak of a symbol pulse and the other one is calculated half a symbol earlier. When the latter value is divided by the first value and compared to a fixed value calculated for an ideal pulse, the result is an error signal. For example, if the signal impulse is a 35% raised cosine pulse (the peak value of which is normalized to 1), the value half a symbol earlier than its peak is approximately equal to 0.7. To remove the complex phase of the signal, the signal is squared thus giving an approximate value of 0.4. When the latter value is divided by the former value, the result is equal to 0.4. This is the ideal value to be achieved by a received symbol that is in synchronization.

Figure 9:
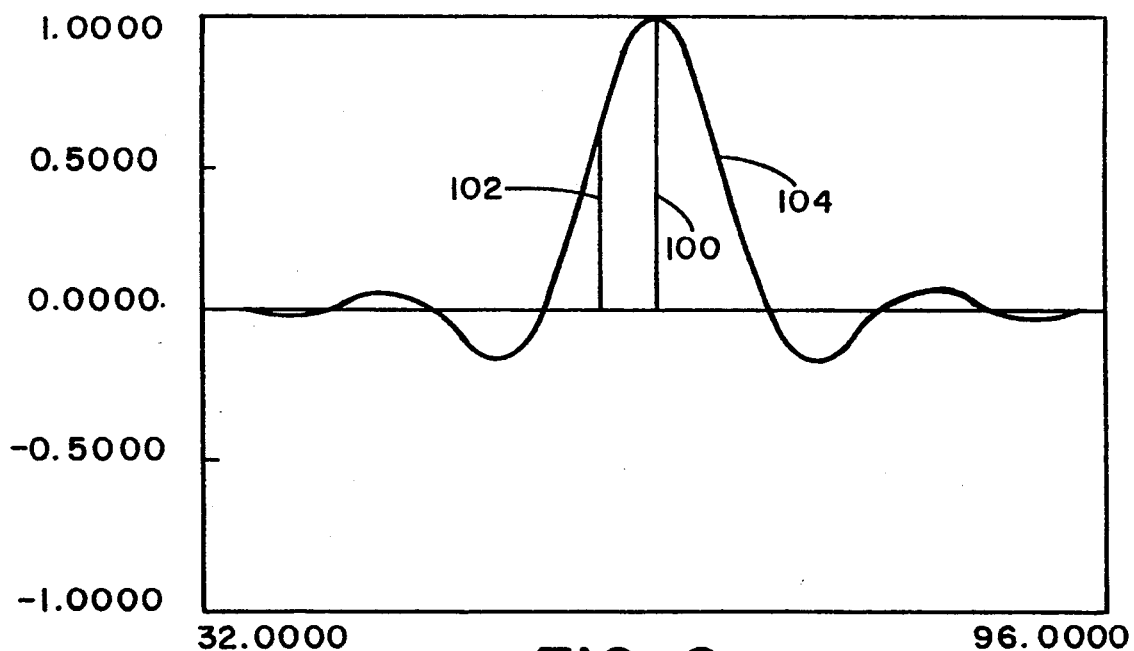
FIG. 9 shows a symbol waveform being amplitude sampled at optimal times.
Figure 10:
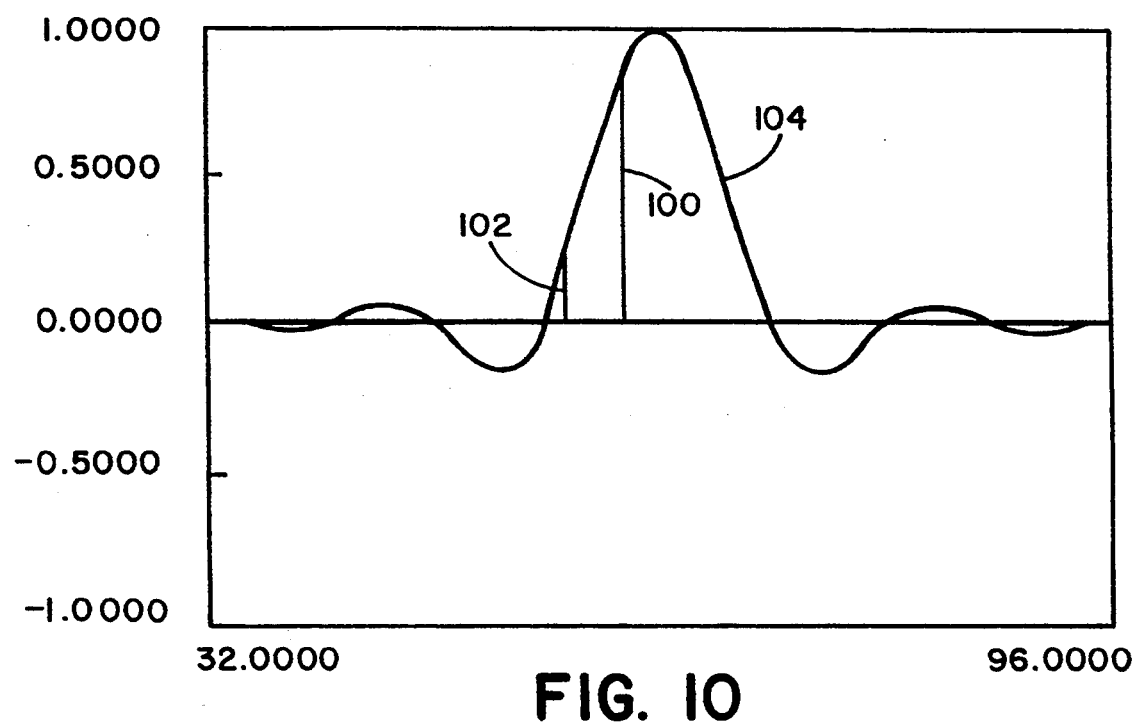
FIG. 10 shows a symbol waveform that has advanced in phase with respect to the amplitude sample times.
Figure 11:
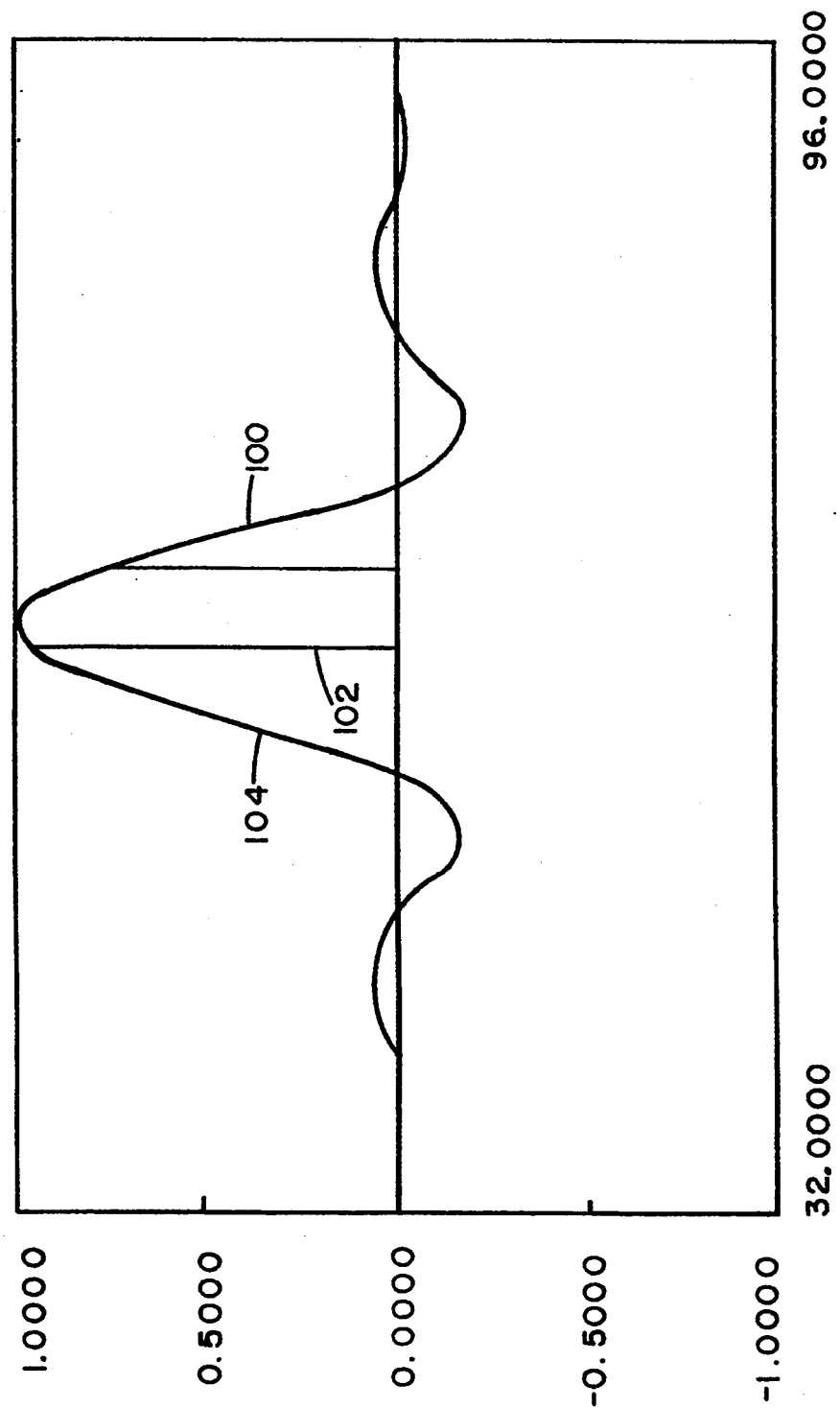
FIG. 11 shows a symbol waveform that has been retarded in phase with respect to the amplitude sampling times.

The circuit of FIG. 8 determines whether such a ratio exists, and if not, adjusts the sampling time in such a manner so as to bring such a ratio into being. Symbol synchronization block 46 provides a pair of gating pulses via line 60 to gated A/D converter 16. In FIG. 9, set of sampling pulses 100 and 102 is illustrated with respect to symbol signal 104. If a proper synchronization relationship exists between symbol signal 104 and sample pulses 100 and 102, sample pulse 100 samples the peak of signal 104 and sample pulse 102 samples a level of signal 104 that is exactly a half symbol time prior to its peak time. By contrast (as shown in FIG. 10) if symbol signal 104 is advanced in time with respect to sample pulses 100 and 102, a proper relationship between the sample values will not exist. In a similar manner, if as shown in FIG. 11, symbol signal 104 has been delayed so that sampling pulses 100 and 102 are advanced in time from that desired, again the results of amplitude values sampled at the times pulses 100 and 102 are generated, will not exhibit the proper relationship.

In FIG. 8, the output from gated A/D block 16 is applied, in parallel, to a pair of registers 62 and 64. Each register holds four pairs of complex amplitude sample values from gated A/D block 16. The initial amplitude sample value for each symbol (pulse 100) is stored in stages 66 whereas the second amplitude sample value is stored in register stages 68. Thus, a pair of adjacent register stages 66 and 68 will contain a pair of sampled symbol amplitude values from a received symbol signal. An output from each of stages 68 in register 62 is fed to a multiplier 70, to which one of a plurality of coefficients C1–C4 is applied. Those coefficients are determined from the expected symbol values of the synchronizing signal sequence assigned to radio telephone 10. Similarly, an output from each of stages 66 in register 64 is applied to a multiplier 72. Also applied to each multiplier 72 is a set of coefficients C1–C4. Thus it can be seen, that the outputs from multipliers 70 and 72 represent a correlation of the sampled amplitude values and coefficients Cl–C4, respectively.

The outputs from each of multipliers 70 are applied to a summing circuit 76 and the outputs from each of multipliers 72 are applied to a summing circuit 78. Outputs from summing circuits 76 and 78 are applied through squaring circuits 80 and 82 to a divider circuit 84. As indicated above, if the sampled synchronizing sequence is in synchronism with the receiver circuits (i.e., symbol signals 104 are properly synchronized with sample pulses 100 and 102), outputs from summers 76 and 78, after squaring, will provide an output approximately equal to 0.4 from divider 84. If, however, received symbol signals are not in synchronism with sample pulses 100 and 102, the output from divider 84 will be another value.

The output from divider 84 is applied as an input to a difference circuit 86, the other input to which is the expected output value from divider 84 if signal synchronization is proper. Thus, a signal appearing on line 88 from difference circuit 86 will be an error value that is equal to the difference between the output from divider circuit 84 and the expected value input to difference circuit 86.

The error signal on line 88 is fed through a low pass filter 90, an integrator 92 and detector 94 to a counter block 96. Because of the phenomenon of fast fading and multipath propagation, the arrival time of synchronization sequences varies substantially. Consequently, the error signal appearing on line 88 is filtered before it is used. Filter 90, integrator 92 and detector 94 accomplish such filtering.

Sample pulses 100 and 102 are generated by counter block 96. Counter block 96 always issues a pulse pair 100 and 102 with a set time therebetween, however, the absolute time of occurrence between succeeding pulse pairs is controllable by a count achieved within counter block 96. For instance, only when the aforementioned output from divider circuit 84 is equal to a preset value (e.g. 0.4) does the output of comparator circuit 86 achieve a null. Under those conditions, the count within counter block 96 is constant between succeeding pulse pairs 100 and 102. Such a situation arises when the relationship between signal symbol 104 and pulses 100 and 102 is as shown in FIG. 9.

By contrast, if symbol signal 104 has advanced in phase with respect to pulses 100 and 102, then a positive level appears on output line 88 from comparator circuit 86. That positive level, after filtering, integration and detection causes counter 96 to increase its count by one pulse. As a result, the time between succeeding pulse pairs 100 and 102 is increased by one count.

If the relationship between symbol signal 104 and pulses 100, 102 is as shown in FIG. 11, then a negative level issues from comparator circuit 86 which causes the count issued from counter 96 to decrement by one count. Over the course of a plurality of samples, pulses 100, 102 are thus brought into synchronism with symbol signal 104. As can thus be seen, the circuit of FIG. 8 continually provides correction for the interval between succeeding pulse pairs 100, 102 so as to maintain their time position in proper relationship to a received symbol signal.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. In a digital radio communication system including a receiver for receiving a signal stream comprising data frames having data signal sequences and synchronizing signal sequences, a system for synchronizing said receiver, said system comprising:
   sample means for sampling symbol signal levels in said synchronizing signal sequences and said data signal sequences;
   cross correlation means for comparing values derived from the sampled symbol signal levels with a set of coefficient values and for producing an error value output;
   correction means responsive to said error value output for producing a sample control signal output to said sample means to alter a time of sampling of the symbol levels so as to reduce said error output and to thereby achieve time synchronization with said synchronizing signal sequences and data signal sequences;
   means for correlating a received synchronizing signal sequence with a locally stored synchronizing signal Sequence and providing an output indicative of a match therebetween; and
   means response to the output from said correlating means for providing a frame time output based upon a time of receipt of a first synchronizing signal sequence.

2. The system as recited in claim 1 wherein said sample means samples each said symbol signal during first and second sample times in each of a plurality of symbols, a sample at said first sample time exhibiting a different amplitude value than a sample at said second sample time if said sample means is operating in synchronism with said symbol signals in said synchronizing sequence.

3. The system as recited in claim 2 wherein said first and second symbol sample times are separated by a constant time period, said sample control output signal causing said first and second sample times to be moved in tandem with respect to a symbol signal to be sampled.

4. The system as recited in claim 3, wherein said cross correlation means comprises:
   first and second register means, each register means having storage positions for storing symbol level samples for a plurality of symbols;
   means for deriving from said first register means a first summation value indicative of a variation between a plurality of said first sample time amplitude samples and a first set of stored coefficient values, and for deriving from said second register means, a second summation value indicative of a variation between a plurality of said second sample time amplitude samples and a second set of stored coefficient values; and
   means for deriving a ratio between said first and second summation values, said ratio being said error value output.

5. The system as recited in claim 4, wherein said correction means comprises:
   means for comparing said error value to a constant;
   timing interval means for controlling said sample means to provide said first and second symbol level samples; and
   means responsive to said comparing means for modifying said timing interval means to operate said sample means so as to bring said error value closer to said constant.

6. In a digital radio communication system that receives a signal stream comprising data frames having data signal sequences and synchronizing signal sequences, said signal stream being subjected to multipath propagation, a method for synchronizing a receiver in said radio communication system, comprising the steps of:
   level sampling a received synchronizing signal sequence at first and second sample times during each of a plurality of symbols in said received synchronizing signal sequence, said first and second sample times separated by a half symbol time;
   deriving first and second cross correlation results from a combination of prestored coefficients and level samples derived at said first and second sample times;
   calculating a ratio between said first and second cross correlation results;
   subtracting a constant from said ratio to derive an error signal, said constant based upon a ratio that would result if said synchronizing signal sequence and said first and second sample times were in synchronism; and
   employing said error signal to adjust the time of occurrence of said first and second sample times so as to reduce said error signal.

7. The method as recited in claim 6 further comprising the step of:
   squaring said first and second cross correlation results prior to calculation of said ratio.

8. The method as recited in claim 7 wherein said ratio calculation is achieved by dividing a level sample achieved earlier in time with a level result achieve later in time.

9. In a digital radio communication system including a receiver for receiving a signal stream comprising data frames having data signal sequences and synchronizing signal sequences, a system for synchronizing said receiver, said system comprising:
   sample means for sampling symbol signal levels in said synchronizing signal sequences;
   cross correlation means for comparing values derived from the sample symbol signal levels with a set of coefficient values and for producing an error value output;

correction means responsive to said error value output for producing a sample control signal output to said sample means to alter a time of sampling of the symbol levels so as to reduce said error output and to thereby achieve time synchronization with said synchronizing signal sequences;

means for correlating a received synchronizing signal sequence with a locally stored synchronizing signal sequence and providing an output indicative of a match therebetween; and means response to the output from said correlating means for providing a frame time output based upon a time of receipt of a first synchronizing signal sequence.

* * * * *